June 12, 1923.
H. COANDA
TRAILER BOX AND TANK CAR
Filed June 7, 1920
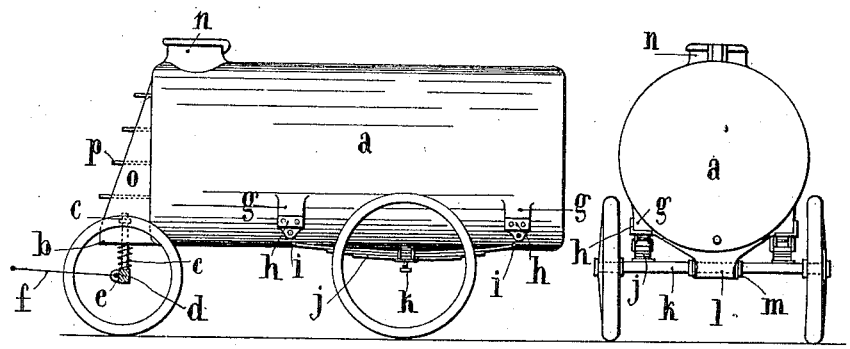
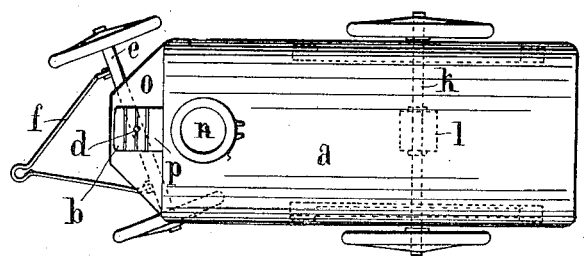
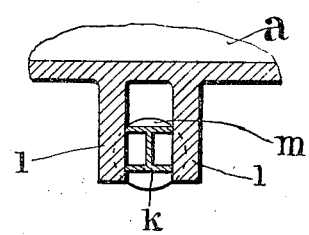
Inventor
H. Coanda
By H. R. Kerslake
Atty.

Patented June 12, 1923.

1,458,465

UNITED STATES PATENT OFFICE.

HENRI COANDA, OF PARIS, FRANCE.

TRAILER BOX AND TANK CAR.

Application filed June 7, 1920. Serial No. 387,169.

*To all whom it may concern:*

Be it known that I, HENRI COANDA, a subject of the King of Rumania, residing at No. 34 Rue de la Verrerie, Paris, France, have invented certain new and useful Improvements in Trailer Box and Tank Cars, of which the following is a specification.

This invention has for its object to provied an improved box or tank car of reinforced concrete adapted to be drawn as a trailer on roads by a tractor.

In an improved trailer box or tank car according to this invention, the usual undercarriage framing, serving as a connection between the box or tank and the road wheel axles, is dispensed with, the suspension springs bearing directly against brackets of reinforced concrete formed in one piece with the reinforced concrete wall of the box or tank.

An embodiment of this invention is illustrated by way of example in the accompanying drawings, in which:—

Figure 1 is a side elevation;
Figure 2 is a plan;
Figure 3 is a rear end elevation of a tank car constructed according to this invention.

Fig. 4 is a fragmentary detail section through the lower portion of the tank body showing the mounting of the rear axle.

In the example shown, the box or tank of the improved car is constructed in such a manner as to itself form all the devices that are required for fixing the parts serving for its suspension to the road wheel axles.

For this purpose the weight of the metal reinforcement is suitably increased at the lower portion of the box or tank in such a way as to endow it with sufficient resistance to the bending strains, thrusts and reactions exerted upon it by the suspensory devices.

Moreover, the metal reinforcement is constructed in such a manner as to form lateral and longitudinal supports to or upon which the spring carrier arms or the springs themselves are attached or take their bearing.

In the example shown, the tank $a$ is formed with a front extension $b$ through which there passes, with the interposition of a spring $c$, a king pin $d$ connected with the steering axle $e$. The latter carries also the coupling triangle $f$.

The cement wall of the tank $a$ has lateral brackets $g$ to which are attached the spring carrier arms $h$ that carry the shackles $i$ of the hind wheel axle springs $j$. The axle $k$ likewise extends through a stop member $l$ provided on the lower portion of the tank $a$ and against which the axle $k$ in its lateral movements can take a bearing, through the medium of interposed shock-absorbers $m$, such as washers of the Belleville type.

It is to be understood that the number of lateral supports and consequently the number of springs sharing in the work of suspension, may be increased in accordance with the weight of the whole.

The tank $a$ has an upper filling fitment $n$. The front reinforcing members $o$ that serve to reinforce the extension $b$, which is traversed by the king pin $d$, may be utilized for the provision of a ladder $p$ which will give access to the filling fitment $n$.

Having now described my invention, what I claim as new and desire to secure by Letters Patent is:—

1. In a tank car, a cistern body, stops depending from the lower rear portion of said body, an axle arranged to move freely between said stops in a vertical plane, collars on said axle arranged at the opposite ends of the stops, resilient elements interposed between the collars and the adjacent faces of the stops, and means resiliently connecting the axle with the body.

2. In a tank car, a tank body, a resilient extension at the lower front part of said body, upwardly extending bracing members connecting the extension with the front of the tank body and arranged in spaced relation, and a king bolt extending through the portion of the extension lying intermediate the bracing members and said axle.

In testimony whereof I have signed my name to this specification.

HENRI COANDA.